(12) United States Patent
Whitney et al.

(10) Patent No.: US 11,734,128 B2
(45) Date of Patent: Aug. 22, 2023

(54) SYSTEM AND METHOD FOR PROVIDING DIRECT HOST-BASED ACCESS TO BACKUP DATA

(71) Applicant: EMC IP Holding Company, LLC, Hopkinton, MA (US)

(72) Inventors: William C. Whitney, Marlborough, MA (US); Qi Jin, Sudbury, MA (US); Nagasimha G. Haravu, Apex, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/379,319

(22) Filed: Jul. 19, 2021

(65) Prior Publication Data

US 2023/0019626 A1   Jan. 19, 2023

(51) Int. Cl.
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,584,339 B1* | 9/2009 | Bingham | G06F 11/1466 711/161 |
| 10,635,544 B1* | 4/2020 | Kitson | G06F 11/1456 |
| 2020/0401487 A1* | 12/2020 | Ghodake | G06F 11/1469 |
| 2021/0357246 A1* | 11/2021 | Kumar | G06F 3/0665 |

\* cited by examiner

*Primary Examiner* — Eddy Cheung
(74) *Attorney, Agent, or Firm* — Brian J. Colandreo; Heath M. Sargeant; Holland & Knight LLP

(57) ABSTRACT

A method, computer program product, and computing system for receiving a selection of a portion of data from a backup storage appliance communicatively coupled to a storage system. A copy of the selected portion of the data may be generated on the backup storage appliance, thus defining a data backup copy. One or more hosts may be provided with direct access to the data backup copy using the storage system.

20 Claims, 6 Drawing Sheets

SYSTEM AND METHOD FOR PROVIDING DIRECT HOST-BASED ACCESS TO BACKUP DATA

BACKGROUND

Storing and safeguarding electronic content may be beneficial in modern business and elsewhere. Accordingly, various methodologies may be employed to protect and distribute such electronic content.

For example, a host may use a storage array to access backup data stored in a backup appliance for the purpose of operation recovery. However, conventional approaches for this backup access require restoring the data back onto the storage array prior to allowing access to the host. This can be time consuming when the size of the dataset is large, and the time required to restore the data may exceed the Recovery Time Objective (RTO). In addition to the time to restore the data, there is also a storage requirement for what may be transient access to the data. It is also possible that only a small portion of the data is required to satisfy the recovery objective and restoring the entire dataset data may not be necessary.

SUMMARY OF DISCLOSURE

In one example implementation, a computer-implemented method executed on a computing device may include, but is not limited to, receiving a selection of a portion of data from a backup storage appliance communicatively coupled to a storage system. A copy of the selected portion of the data may be generated on the backup storage appliance, thus defining a data backup copy. One or more hosts may be provided with direct access to the data backup copy using the storage system.

One or more of the following example features may be included. Receiving a selection of a portion of data from a backup storage appliance communicatively coupled to a storage system may include receiving a selection of a snapshot from the backup storage appliance. Providing one or more hosts with direct access to the data backup copy using the storage system may include processing one or more IO requests from the storage system on the data backup copy on the backup storage appliance. Processing one or more IO requests from the storage system on the data backup copy on the backup storage appliance may include: generating a proxy volume associated with the data backup copy within the storage system; and processing one or more IO requests associated with the proxy volume on the data backup copy on the backup storage appliance. Processing one or more IO requests associated with the proxy volume on the data backup copy on the backup storage appliance may include: receiving the one or more IO requests associated with the proxy volume within the storage system; and redirecting the one or more IO requests associated with the proxy volume within the storage system for processing on the data backup copy on the backup storage appliance. Data from the backup storage appliance may be copied to the storage system while processing the one or more IO requests from the storage system on the data backup copy on the backup storage appliance. A request to discontinue the access to the data backup copy may be received. The data backup copy may be deleted from the backup storage appliance.

In another example implementation, a computer program product resides on a computer readable medium that has a plurality of instructions stored on it. When executed by a processor, the instructions cause the processor to perform operations that may include, but are not limited to, receiving a selection of a portion of data from a backup storage appliance communicatively coupled to a storage system. A copy of the selected portion of the data may be generated on the backup storage appliance, thus defining a data backup copy. One or more hosts may be provided with direct access to the data backup copy using the storage system.

One or more of the following example features may be included. Receiving a selection of a portion of data from a backup storage appliance communicatively coupled to a storage system may include receiving a selection of a snapshot from the backup storage appliance. Providing one or more hosts with direct access to the data backup copy using the storage system may include processing one or more IO requests from the storage system on the data backup copy on the backup storage appliance. Processing one or more IO requests from the storage system on the data backup copy on the backup storage appliance may include: generating a proxy volume associated with the data backup copy within the storage system; and processing one or more IO requests associated with the proxy volume on the data backup copy on the backup storage appliance. Processing one or more IO requests associated with the proxy volume on the data backup copy on the backup storage appliance may include: receiving the one or more IO requests associated with the proxy volume within the storage system; and redirecting the one or more IO requests associated with the proxy volume within the storage system for processing on the data backup copy on the backup storage appliance. Data from the backup storage appliance may be copied to the storage system while processing the one or more IO requests from the storage system on the data backup copy on the backup storage appliance. A request to discontinue the access to the data backup copy may be received. The data backup copy may be deleted from the backup storage appliance.

In another example implementation, a computing system includes at least one processor and at least one memory architecture coupled with the at least one processor, wherein the at least one processor is configured to receive a selection of a portion of data from a backup storage appliance communicatively coupled to a storage system. The processor may be further configured to generate a copy of the selected portion of the data on the backup storage appliance, thus defining a data backup copy. The processor may be further configured to provide one or more hosts with direct access to the data backup copy using the storage system.

One or more of the following example features may be included. Receiving a selection of a portion of data from a backup storage appliance communicatively coupled to a storage system may include receiving a selection of a snapshot from the backup storage appliance. Providing one or more hosts with direct access to the data backup copy using the storage system may include processing one or more IO requests from the storage system on the data backup copy on the backup storage appliance. Processing one or more IO requests from the storage system on the data backup copy on the backup storage appliance may include: generating a proxy volume associated with the data backup copy within the storage system; and processing one or more IO requests associated with the proxy volume on the data backup copy on the backup storage appliance. Processing one or more IO requests associated with the proxy volume on the data backup copy on the backup storage appliance may include: receiving the one or more IO requests associated with the proxy volume within the storage system; and redirecting the one or more IO requests associated with the proxy volume within the storage system for processing on the data backup copy on the backup storage appliance. Data from the backup storage appliance may be copied to the storage system while processing the one or more IO requests from the storage system on the data backup copy on the backup storage appliance. A request to discontinue the access to the data backup copy may be received. The data backup copy may be deleted from the backup storage appliance.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
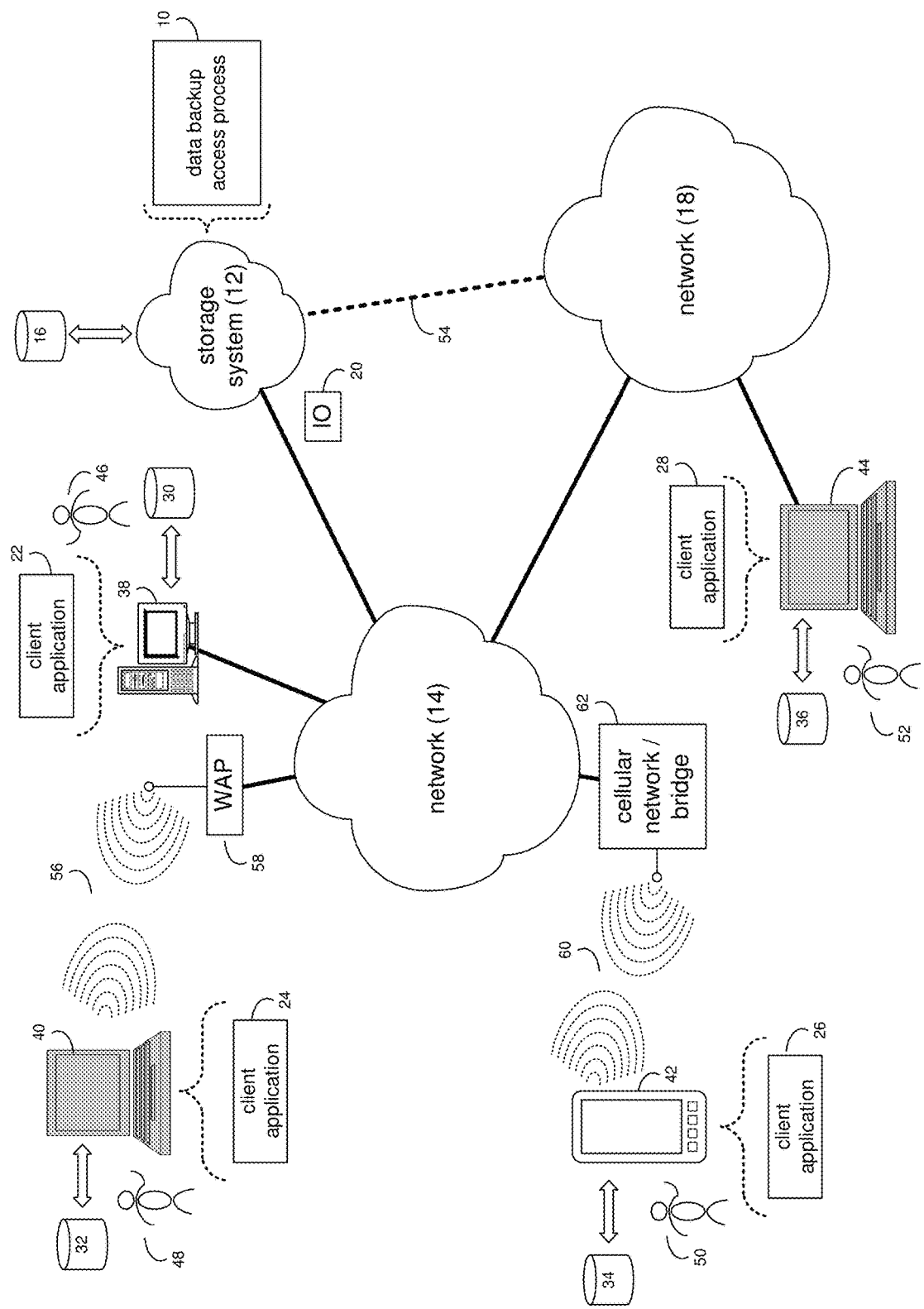
FIG. 1 is an example diagrammatic view of a storage system and a backup data access process coupled to a distributed computing network according to one or more example implementations of the disclosure.

System Overview:

Referring to FIG. 1, there is shown backup data access process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of backup data access process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of backup data access process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be wFritten to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a defect identifier generation process, such as backup data access process 10 of FIG. 1, may include but is not limited to, receiving a selection of a portion of data from a backup storage appliance communicatively coupled to a storage system. A copy of the selected portion of the data may be generated on the backup storage appliance, thus defining a data backup copy. One or more hosts may be provided with direct access to the data backup copy using the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
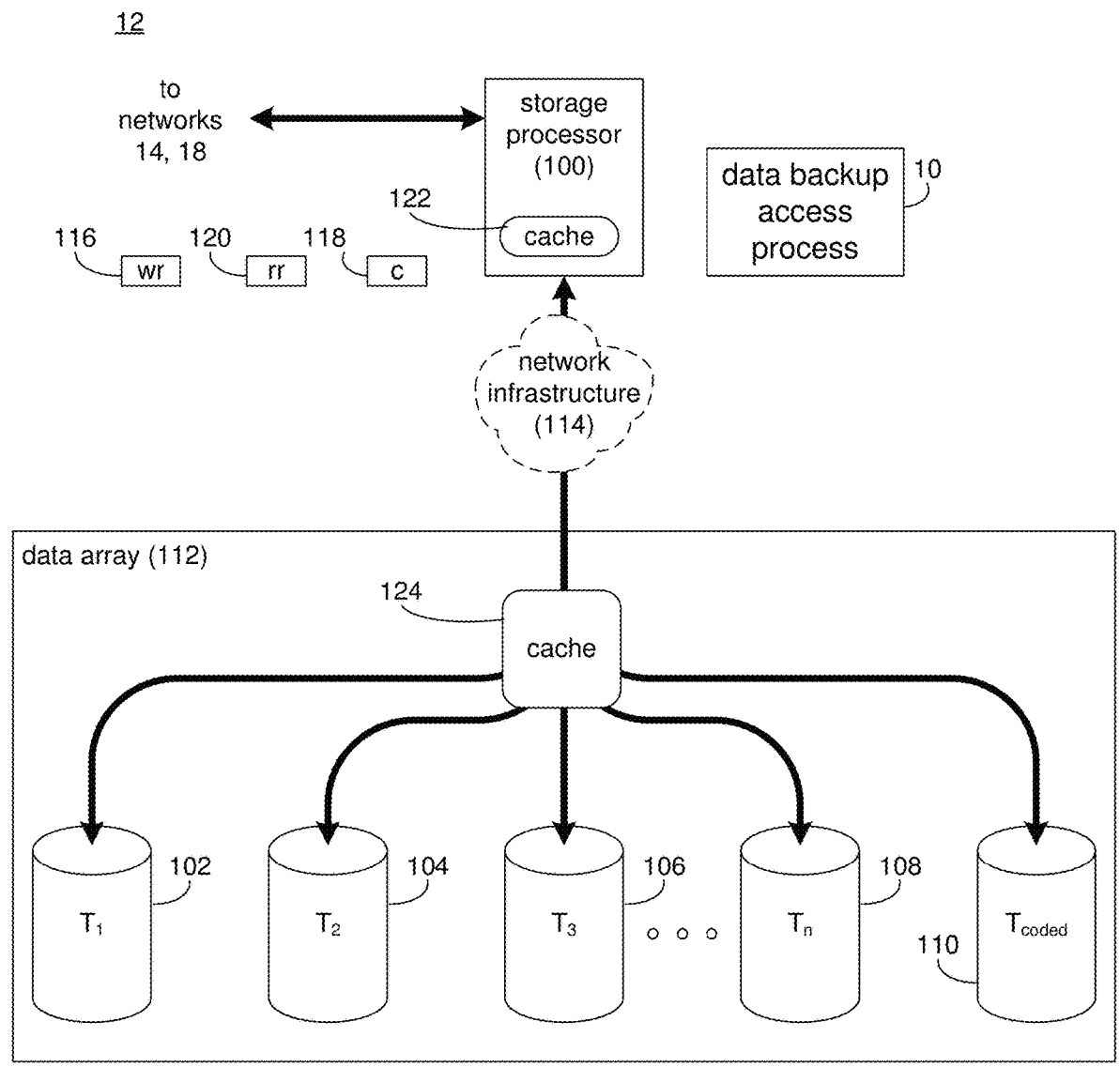
FIG. 2 is an example diagrammatic view of the storage system of FIG. 1 according to one or more example implementations of the disclosure.
Figure 3:
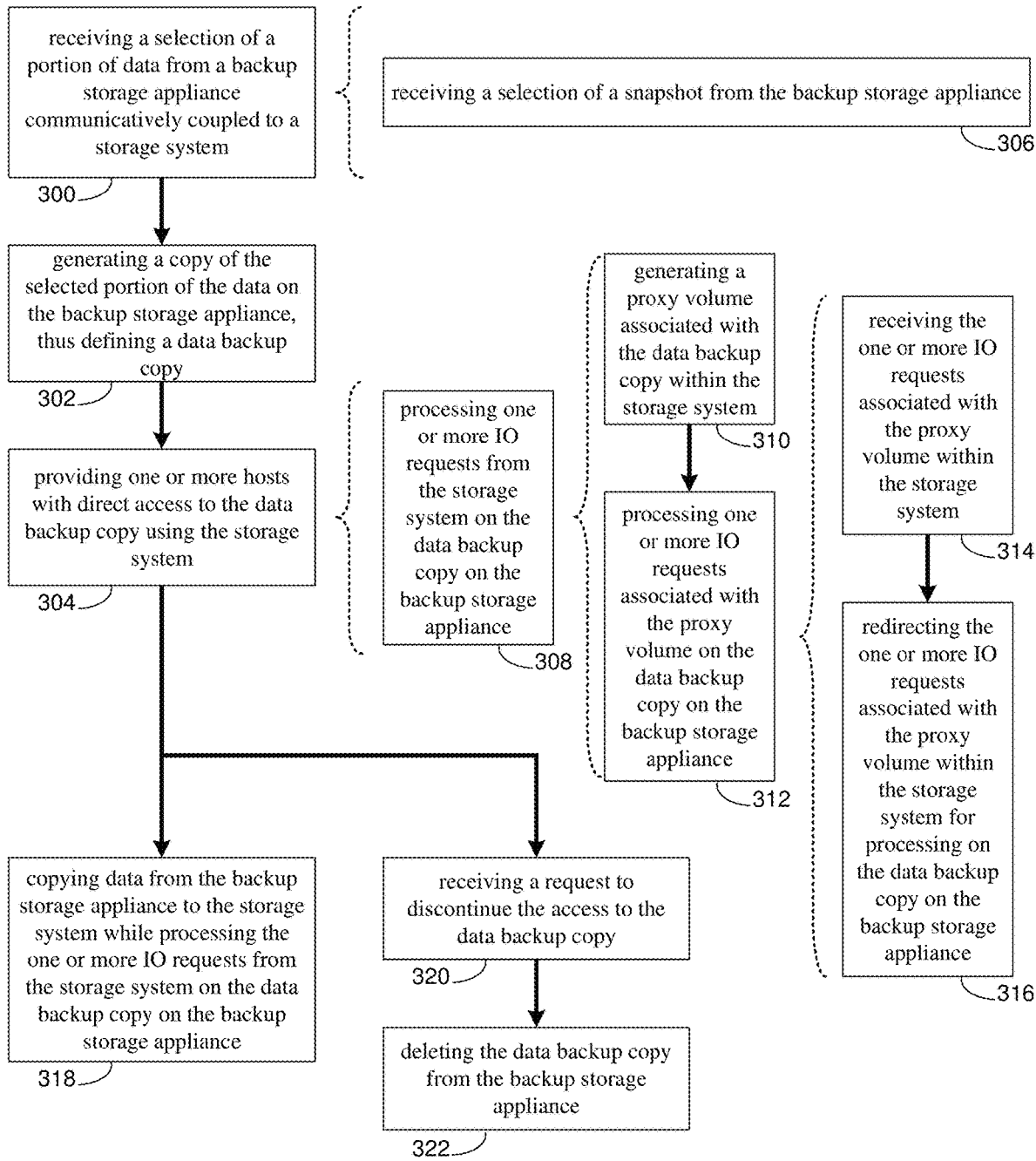
FIG. 3 is an example flowchart of backup data access process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of backup data access process 10. The instruction sets and subroutines of backup data access process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of backup data access process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of backup data access process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of backup data access process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Backup Data Access Process:

Referring also to the examples of FIGS. 3-6 and in some implementations, backup data access process 10 may receive 300 a selection of a portion of data from a backup storage appliance communicatively coupled to a storage system. A copy of the selected portion of the data may be generated 302 on the backup storage appliance, thus defining a data backup copy. One or more hosts may be provided 304 with direct access to the data backup copy using the storage system.

As will be discussed in greater detail below, implementations of the present disclosure may allow for a host to access a portion of backup data directly (e.g., via a storage array/storage system) on a backup repository/storage appliance using the storage array as a proxy without restoring the entire dataset back to the storage array. For example, a host may use a storage array to access backup data stored in a backup appliance for the purpose of operation recovery. However, conventional approaches for this backup access require restoring the data back onto the storage array prior to allowing access to the host. This can be time consuming when the size of the dataset is large, and the time required to restore the data may exceed the Recovery Time Objective (RTO). In addition to the time to restore the data, there is also a storage requirement for what may be transient access to the data. It is also possible that only a small portion of the data is required to satisfy the recovery objective and restoring the entire dataset may not be necessary. Accordingly, implementations of the present disclosure may allow the host to access backup data directly from a backup storage appliance and may allow a host to selectively access only the specific data needed.

Figure 4:
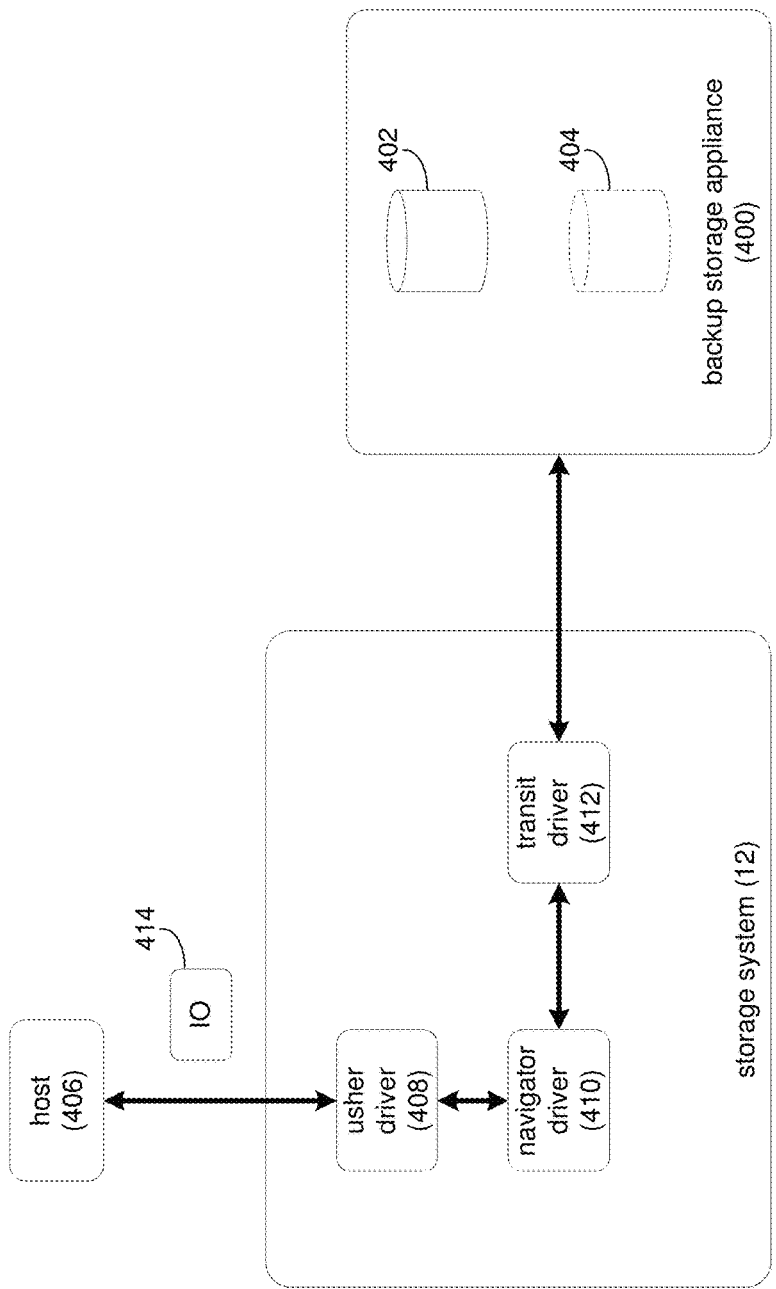
FIGS. 4-6 are example diagrammatic views of the storage system of FIG. 1 according to one or more example implementations of the disclosure.

In some implementations, backup data access process 10 may receive 300 a selection of a portion of data from a backup storage appliance communicatively coupled to a storage system. A backup storage appliance may generally include a data storage appliance configured to store data backups. As is known in the art, a backup storage appliance may be configured to store backup or recovery versions of data on data array 112. For example, various applications may be configured to provide data for backing up on a backup storage appliance. In some implementations, a user may select the interval (e.g., once, every hour, every day, after a threshold amount of time, after receiving changes to the data, etc.) for backing up data to the backup storage appliance. In some implementations, the backup storage appliance may be a part of a storage system and/or may be physically separate from the storage system (e.g., a remote backup storage appliance). Referring also to FIG. 4 and in some implementations, a storage system (e.g., storage system 12) may be configured to be communicatively coupled to a backup storage appliance (e.g., backup storage appliance 400). In this example, backup storage appliance 400 may be configured to store backup data from storage system 12.

In some implementations, backup data access process 10 may receive 300 a selection of a portion of data from a backup storage appliance to access. For example, backup data access process 10 may provide a graphical user interface configured to enable a user to select portions of data from the backup storage appliance to access. In some implementations, backup data access process 10 may receive 300 a selection of a backup storage container (e.g., a backup volume, a backup file system, etc.) which may include backup data associated with the backup storage container. For example, suppose a user would like to access a particular file (e.g., a 1 megabyte (MB) file) from a backup storage container. Backup data access process 10 may receive 300 a selection of the backup volume including the desired file. For instance and in some implementations, a backup storage appliance may generally not be able to provide access to particular files within a backup storage container.

In some implementations, receiving 300 a selection of a portion of data from a backup storage appliance may include receiving 306 a selection of a snapshot from the backup storage appliance. For example, suppose the user would like to access a particular snapshot (e.g., a 10 megabyte (MB) snapshot of a file) from a backup storage container. In this example, suppose that the backup storage appliance is able to provide access to particular files within a backup storage container. Accordingly, backup data access process 10 may receive 306 a selection of the particular snapshot for access.

In some implementations, backup data access process 10 may generate 302 a copy of the selected portion of the data on the backup storage appliance, thus defining a data backup copy. For example and as discussed above, suppose backup data access process 10 receives 306 a selection of e.g., a particular snapshot within the backup storage appliance. Backup data access process 10 may generate 302 a copy of the selected snapshot on the backup storage appliance. Referring again to the example of FIG. 4 and in some implementations, suppose backup data access process 10 receives a selection of a snapshot (e.g., snapshot 402) stored in backup storage appliance 400. In this example, suppose a user wants to access snapshot 402 generally or a particular file of snapshot 402. Conventional methods for providing access to backup data generally include copying the backup data to the storage system. However, with these conventional approaches, the backup data would be inaccessible until the backup data is finished copying to the storage array. Accordingly, the backup data may include large snapshots or other backup storage container with potentially gigabytes or more of data. As such and when utilizing conventional approaches, the user may be required to copy large collections of backup data to a storage array for access and may be unable to access any portion of the backup data until the entirety of the backup data is copied to the storage array.

Referring again to FIG. 4 and in some implementations, backup data access process 10 may generate 302 a copy of the selected portion of the data (e.g., snapshot 402) on the backup storage appliance to define a data backup copy accessible on the backup storage appliance (e.g., data backup copy 404). In this manner, data backup copy 404 may be copied more quickly within backup storage appliance than when copying data from backup storage appliance 400 to storage system 12. In some implementations, generating 302 the copy of the selected portion of the data on the backup storage appliance may include providing access to the data backup copy (e.g., data backup copy 404) on the backup storage appliance (e.g., backup storage appliance 400) to the storage system (e.g., storage system 12). For example, backup data access process 10 may store a data handle or other identifier for data backup copy 404. Accordingly and as will be discussed in greater detail below, storage system 12 may be configured to access data backup copy 404 within backup storage appliance 400 based upon, at least in part, the data handle.

In some implementations, backup data access process 10 may provide 304 one or more hosts with direct access to the data backup copy using the storage system. For example, backup data access process 10 may utilize various drivers to provide one or more hosts access to the data backup copy on the backup storage appliance. In some implementations, backup data access process 10 may provide 304 "direct access" to the data backup copy from the perspective of the one or more hosts (e.g., host 406). In some implementations, backup data access process 10 may initialize an "usher" driver (e.g., usher driver 408) configured to receive IO requests from host 406 and relay them within storage system 12. Backup data access process 10 may also initialize a "navigator" driver (e.g., navigator driver 410) configured to direct IO requests within the storage system and/or to external devices. For example and as will be discussed in greater detail below, backup data access process 10 may, via navigator driver 410, redirect IO requests associated with a proxy volume to data backup copy 404. In some implementations, backup data access process 10 may initialize a "transit" driver (e.g., transit driver 412) configured to execute remote IO requests on a remote backup storage appliance. In some implementations, backup data access process 10 may provide the data handle associated with data backup copy 404 to transit driver 412 to enable access to data backup copy 404.

As shown in FIG. 4, the combination of usher driver 408, navigator driver 410, and transit driver 412 may enable storage system 12 to provide host 406 with direct access (from the perspective of host 406) to data backup copy 404 of backup storage appliance 400. As will be discussed in greater detail below, host 406 may process one or more IO requests on data backup copy 404 of backup storage appliance 400 using storage system 12 as a proxy. While FIG. 4 shows e.g., three drivers within storage system 12, it will be appreciated that these individual drivers may be combined or separated into any number of drivers configured to perform any number of discrete functions to provide a host access to the data backup copy, within the scope of the present disclosure.

In some implementations, providing 304 one or more hosts with direct access to the data backup copy using the storage system may include processing 308 one or more IO requests from the storage system on the data backup copy on the backup storage appliance. As shown in FIG. 4 and in some implementations, backup data access process 10 may process 308 one or more IO requests from the storage system on the data backup copy on the backup storage appliance. For example, suppose host 406 issues IO request 414 for processing on data backup copy 404. In this example, backup data access process 10 may process 308 IO request 414 directly (e.g., from the perspective of host 406) on data backup copy 404 using the combination of usher driver 408, navigator driver 410, and transit driver 412 within storage system 12. For instance, usher driver 408 may receive IO request 414 from host 406 and direct IO request 414 to navigator driver 410. In this example, navigator driver 410 may be configured to identify data backup copy 404 based upon, at least in part, IO request 414 and the data handle provided to navigator driver 410. In some implementations, navigator driver 410 may provide IO request 414 to transit driver 412 which may enable the communication and processing of IO request 414 on data backup copy 404 of backup storage appliance 400.

In some implementations, processing 308 one or more IO requests from the storage system directly on the data backup copy on the backup storage appliance may include generating 310 a proxy volume associated with the data backup copy within the storage system. For example, a proxy volume may generally include a storage container within the storage system configured to be the target of one or more IO requests sent from the host. However and as will be discussed in greater detail below, the proxy volume may be configured not to store the data from the data backup copy. Rather, the proxy volume may allow one or more IO requests to be processed on the storage array as though the data backup copy was located on the storage array. In some implementations, generating 310 the proxy volume may include providing a host with access to the proxy volume using the data handle.

Figure 5:
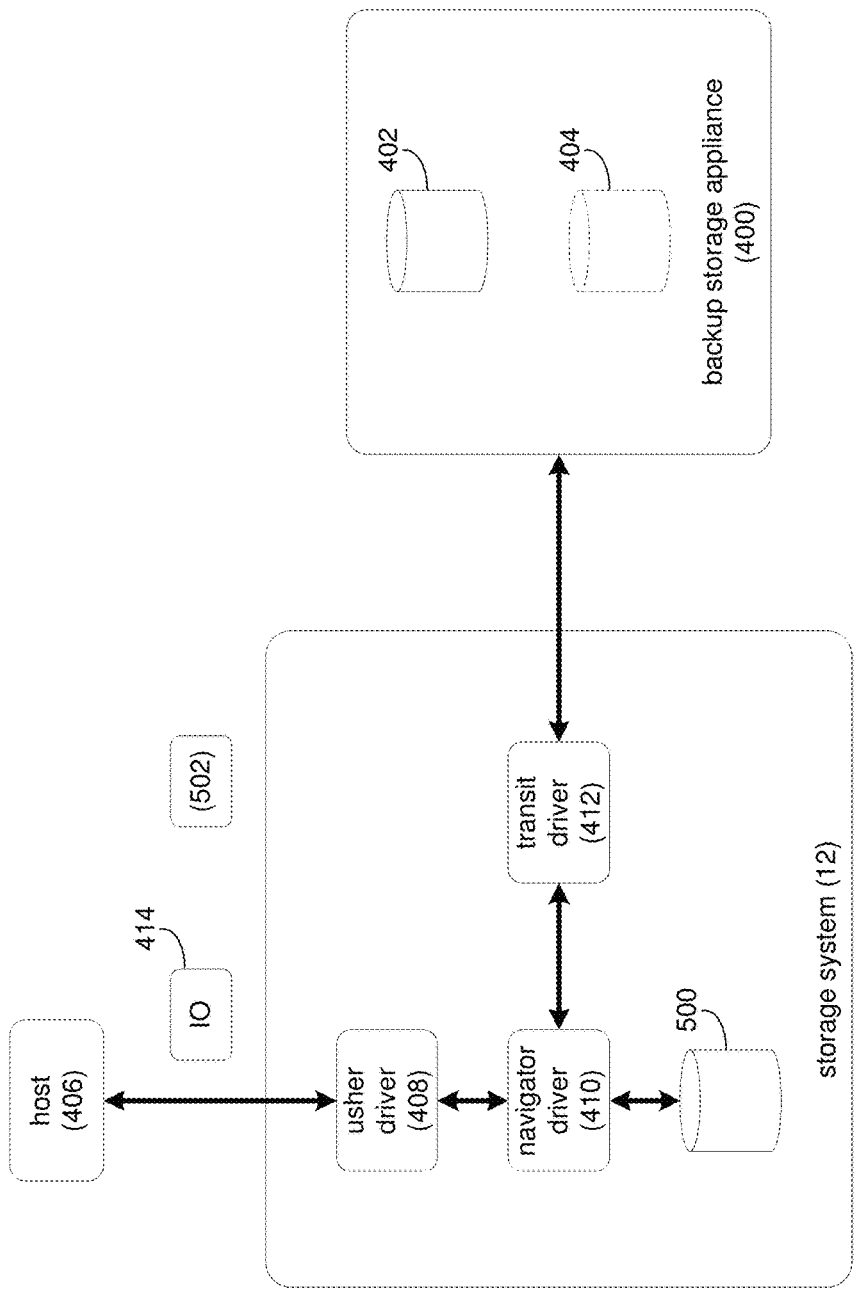

Referring also to FIG. 5 and in some implementations, backup data access process 10 may generate 310 a proxy volume (e.g., proxy volume 500) associated with data backup copy 404 within storage system 12. In some implementations, backup data access process 10 may configure one or more drivers for communicating with a host (e.g., host 406), proxy volume 500 of storage system 12, and data backup copy 404 of backup storage appliance 400. As will be discussed in greater detail below, in response to generating 310 proxy volume 500 associated with data backup copy 404, backup data access process 10 may signal host 406 to scan or rescan storage system 12 for proxy volume 500. In this manner, host 406 may provide IO requests associated with proxy volume 500 without generating a new IO path directly from host 406 to data backup copy 404.

In some implementations, processing 308 the one or more IO requests may include processing one or more IO read requests and/or one or more IO write requests. For example, data within a backup storage appliance is typically read-only. However and in some implementations, backup data access process 10 may execute one or more IO write requests on the data backup copy (e.g., for data validation or for other data integrity purposes). Accordingly, conventional approaches that permit only the processing of IO read requests on backup data may be unable to utilize IO write requests. In this manner, backup data access process 10 may process 308 one or more IO read requests and/or one or more IO write requests from the host directly on the data backup copy of the backup storage appliance.

In some implementations, processing 308 one or more IO requests from the storage system on the data backup copy on the backup storage appliance may include processing 312 one or more IO requests associated with the proxy volume on the data backup copy on the backup storage appliance. For example, backup data access process 10 may allow a host to process 312 one or more IO requests on the data backup copy on the backup storage appliance without altering the IO path between the host and the storage system. For instance and in response to generating 310 the proxy volume, backup data access process 10 may signal or direct the host to scan or rescan the storage system to detect the proxy volume. Accordingly, the host may be configured to send IO requests to the proxy volume. In this manner, with a proxy volume, the host may provide IO requests to the storage system and the storage system may provide the IO requests to the data copy backup. Accordingly, the host may communicate with the backup storage appliance via storage system 12 without creating a new IO path directly between the host and the backup storage appliance.

In some implementations, processing 312 one or more IO requests associated with the proxy volume on the data backup copy on the backup storage appliance may include receiving 314 the one or more IO requests associated with the proxy volume within the storage system; and redirecting 316 the one or more IO requests associated with the proxy volume within the storage system for processing on the data backup copy on the backup storage appliance. For example, suppose host 406 issues IO request 414 associated with proxy volume 500. In this example, backup data access process 10 may process 312 IO request 414 directly on data backup copy 404 using the combination of usher driver 408, navigator driver 410, and transit driver 412. For instance, usher driver 408 may receive 314 IO request 414 associated with proxy volume 500 from host 406 and direct IO request 414 to navigator driver 410. Navigator driver 410 may be configured to identify data backup copy 404 based upon, at least in part, IO request 414 and the data handle provided to navigator driver 410. Navigator driver 410 may redirect 316 IO request 414 associated with proxy volume 500 for processing on data backup copy 404 on backup storage appliance 400. For example, navigator driver 410 may redirect 316 IO request 414 associated with proxy volume 500 to transit driver 412 for processing of IO request 414 on data backup copy 404 on backup storage appliance 400.

In some implementations, backup data access process 10 may copy 318 data from the backup storage appliance to the storage system while processing the one or more IO requests from the storage system on the data backup copy on the backup storage appliance. For example and in some implementations, backup data access process 10 may receive a request to copy data from the backup storage appliance. Backup data access process 10 may copy 318 data (e.g., the same data from the data backup copy or different data) from the backup storage appliance to the storage system while processing the one or more IO requests from the storage system on the data backup copy on the backup storage appliance.

Figure 6:
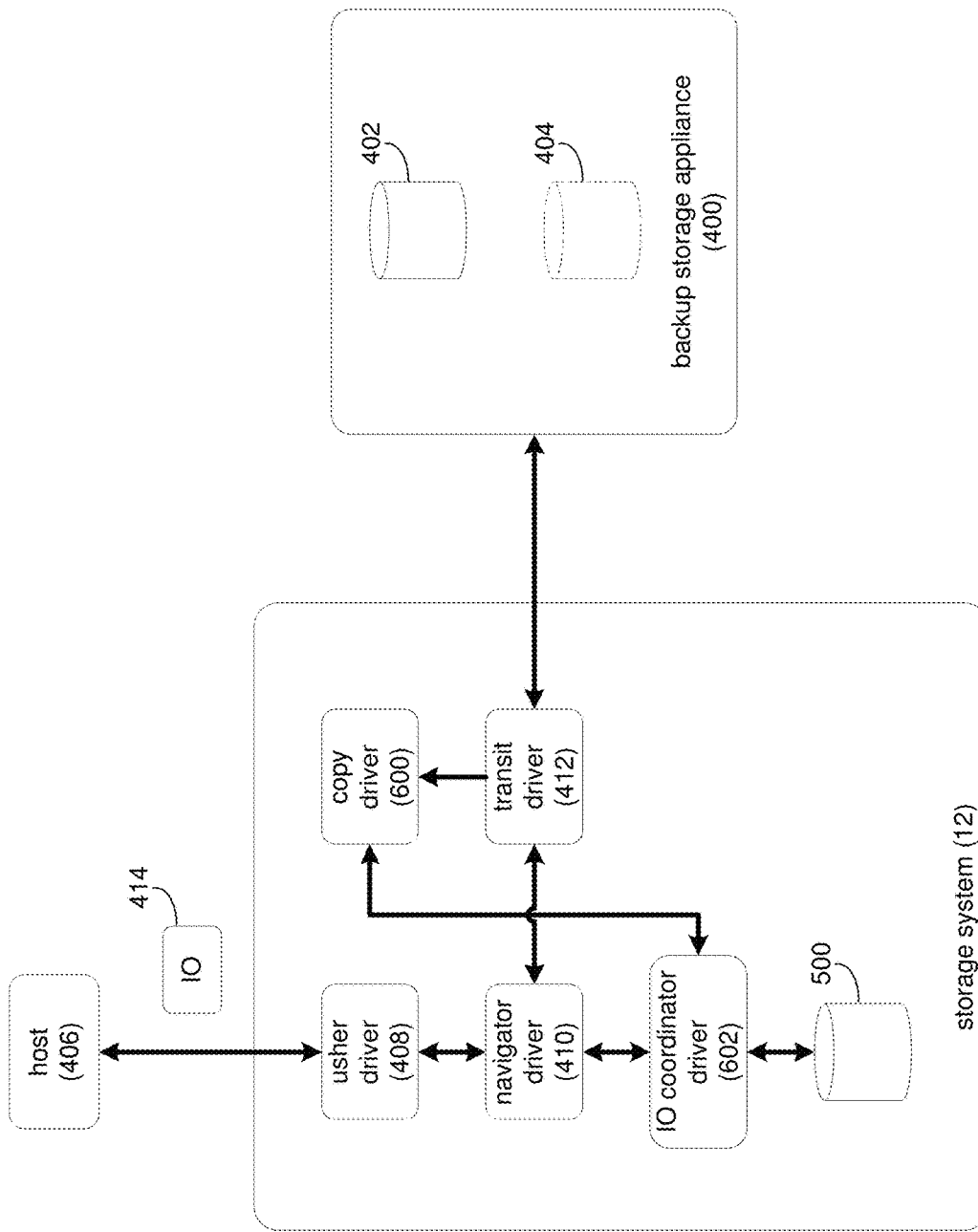

Referring also to FIG. 6 and in some implementations, backup data access process 10 may initialize a copy driver (e.g., copy driver 600) and an IO coordinator driver (e.g., IO coordinator driver 602) within storage system 12 to copy 318 data from backup storage appliance 400 to the storage system. In some implementations, copy driver 600 may be configured to communicate with transit driver 412 to receive data from backup storage appliance 400 and provide the data to IO coordinator driver 602. In some implementations, IO coordinator driver 602 may be configured to provide the copied data to one or more storage containers within the storage system. In one example, backup data access process 10 may copy 318 the data from backup storage appliance 400 to proxy volume 500. However, it will be appreciated that backup data access process 10 may copy 318 the data from backup storage appliance 400 to any volume or any number of volumes or other storage containers within the scope of the present disclosure.

Referring again to FIG. 6 and in some implementations, backup data access process 10 may receive a request to copy data from backup storage appliance 400 to storage system 12. In one example, backup data access process 10 may copy 318 the data from backup storage appliance 400 to proxy volume 500. In another example, backup data access process 10 may copy 318 the data from backup storage appliance 400 to another volume (e.g., a volume separate from proxy volume 500). In either example, backup data access process 10 may copy 318 the data from backup storage appliance 400 while processing the one or more IO requests from storage system 12 on data backup copy 404 on backup storage appliance 400. In this manner, backup data access process 10 may copy 318 the data from backup storage appliance 400 in parallel with, or in the background of, processing the one or more IO requests from storage system 12 on data backup copy 404 on backup storage appliance 400.

In some implementations, backup data access process 10 may receive 320 a request to discontinue the access to the data backup copy. For example and in response to providing the desired access to the data backup copy, a user may provide a request to discontinue the access to data backup copy. In one example, backup data access process 10 may provide a user interface to receive a command to discontinue the access to the data backup copy. In another example, the indication may be automatically generated (e.g., after a certain threshold). For example, backup data access process 10 may define an access threshold (e.g., an amount of time since last access), a backup storage appliance capacity threshold (e.g., an amount of storage capacity remaining in backup storage appliance), or any other threshold configured to indicate that processing between the data backup copy and the host is complete and/or to indicate that the space within the backup storage appliance is needed for other purposes. While several examples of thresholds have been provided for indicating when to discontinue access to the data backup copy, it will be appreciated that these examples are not exhaustive and that any number of or type of threshold may be used to generate a request to discontinue the access to the data backup copy within the scope of the present disclosure.

In some implementations and in response to receiving 320 the request to discontinue the access to the data backup copy, backup data access process 10 may delete 322 the data backup copy from the backup storage appliance. For example, when access by the host to the data copy backup is no longer needed or desired, backup data access process 10 may delete 322 the backup copy from the backup storage appliance. Referring again to the example of FIG. 5, suppose backup data access process 10 receives 320 a request (e.g., request 502) to discontinue the access to data backup copy 404, backup data access process 10 may delete 322 data backup copy 404 from backup storage appliance 400.

In some implementations, backup data access process 10 may delete the proxy volume generated for the data backup copy. Referring again to the example of FIG. 5, suppose backup data access process 10 receives 320 a request (e.g., request 502) to discontinue the access to data backup copy 404, backup data access process 10 may delete 322 proxy volume 500. In some implementations, backup data access process 10 may receive a request to retain proxy volume 500. For example and as shown in FIG. 6, suppose backup data access process 10 copies 318 data from backup storage appliance 400 to proxy volume 500. In this example, a user may choose to keep the data copied from backup storage appliance 400. Accordingly and in one example, proxy volume 500 may be deleted when data backup copy 404 is deleted. In another example, proxy volume 500 may be retained when additional data is copied to proxy volume 500 while processing the one or more IO requests on data backup copy 404. Accordingly, it will be appreciated that backup data access process 10 may allow proxy volume to be retained or deleted as directed by a user.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving a selection of a portion of data from a backup storage appliance communicatively coupled to a storage system;
   generating a copy of the selected portion of the data on the backup storage appliance, thus defining a data backup copy accessible on the backup storage appliance; and
   providing one or more hosts with direct access to the data backup copy on the backup storage appliance using the storage system without creating a new IO path directly between the one or more hosts and the backup storage appliance by generating a proxy volume associated with the data backup copy within the storage system and directing the one or more hosts to scan or rescan the storage system to detect the proxy volume to send one or more IO requests to the proxy volume.

2. The computer-implemented method of claim 1, wherein receiving a selection of a portion of data from a backup storage appliance communicatively coupled to a storage system includes:
   receiving a selection of a snapshot from the backup storage appliance.

3. The computer-implemented method of claim 1, wherein providing one or more hosts with direct access to the data backup copy using the storage system includes:
   processing one or more IO requests from the storage system on the data backup copy on the backup storage appliance.

4. The computer-implemented method of claim 3, wherein processing one or more IO requests from the storage system on the data backup copy on the backup storage appliance includes:
   processing one or more IO requests associated with the proxy volume on the data backup copy on the backup storage appliance.

5. The computer-implemented method of claim 4, wherein processing one or more IO requests associated with the proxy volume on the data backup copy on the backup storage appliance includes:
   receiving the one or more IO requests associated with the proxy volume within the storage system; and
   redirecting the one or more IO requests associated with the proxy volume within the storage system for processing on the data backup copy on the backup storage appliance.

6. The computer-implemented method of claim 3, further comprising:
   copying data from the backup storage appliance to the storage system while processing the one or more IO requests from the storage system on the data backup copy on the backup storage appliance.

7. The computer-implemented method of claim 1, further comprising:
   receiving a request to discontinue the access to the data backup copy; and
   deleting the data backup copy from the backup storage appliance.

8. A computer program product residing on a non-transitory computer readable medium having a plurality of instructions stored thereon which, when executed by a processor, cause the processor to perform operations comprising:
   receiving a selection of a portion of data from a backup storage appliance communicatively coupled to a storage system;
   generating a copy of the selected portion of the data on the backup storage appliance, thus defining a data backup copy accessible on the backup storage appliance; and
   providing one or more hosts with direct access to the data backup copy on the backup storage appliance using the storage system without creating a new IO path directly between the one or more hosts and the backup storage appliance by generating a proxy volume associated with the data backup copy within the storage system and directing the one or more hosts to scan or rescan the storage system to detect the proxy volume to send one or more IO requests to the proxy volume.

9. The computer program product of claim 8, wherein receiving a selection of a portion of data from a backup storage appliance communicatively coupled to a storage system includes:
   receiving a selection of a snapshot from the backup storage appliance.

10. The computer program product of claim 8, wherein providing one or more hosts with direct access to the data backup copy using the storage system includes:
 processing one or more IO requests from the storage system on the data backup copy on the backup storage appliance.

11. The computer program product of claim 10, wherein processing one or more IO requests from the storage system on the data backup copy on the backup storage appliance includes:
 processing one or more IO requests associated with the proxy volume on the data backup copy on the backup storage appliance.

12. The computer program product of claim 11, wherein processing one or more IO requests associated with the proxy volume on the data backup copy on the backup storage appliance includes:
 receiving the one or more IO requests associated with the proxy volume within the storage system; and
 redirecting the one or more IO requests associated with the proxy volume within the storage system for processing on the data backup copy on the backup storage appliance.

13. The computer program product of claim 10, wherein the operations further comprise:
 copying data from the backup storage appliance to the storage system while processing the one or more IO requests from the storage system on the data backup copy on the backup storage appliance.

14. The computer program product of claim 8, wherein the operations further comprise:
 receiving a request to discontinue the access to the data backup copy; and
 deleting the data backup copy from the backup storage appliance.

15. A computing system comprising:
a memory; and
a processor configured to receive a selection of a portion of data from a backup storage appliance communicatively coupled to a storage system, wherein the processor is further configured to generate a copy of the selected portion of the data on the backup storage appliance, thus defining a data backup copy accessible on the backup storage appliance, and wherein the processor is further configured to provide one or more hosts with direct access to the data backup copy on the backup storage appliance using the storage system without creating a new IO path directly between the one or more hosts and the backup storage appliance by generating a proxy volume associated with the data backup copy within the storage system and directing the one or more hosts to scan or rescan the storage system to detect the proxy volume to send one or more IO requests to the proxy volume.

16. The computing system of claim 15, wherein receiving a selection of a portion of data from a backup storage appliance communicatively coupled to a storage system includes:
 receiving a selection of a snapshot from the backup storage appliance.

17. The computing system of claim 15, wherein providing one or more hosts with direct access to the data backup copy using the storage system includes:
 processing one or more IO requests from the storage system on the data backup copy on the backup storage appliance.

18. The computing system of claim 17, wherein processing one or more IO requests from the storage system on the data backup copy on the backup storage appliance includes:
 processing one or more IO requests associated with the proxy volume on the data backup copy on the backup storage appliance.

19. The computing system of claim 18, wherein processing one or more IO requests associated with the proxy volume on the data backup copy on the backup storage appliance includes:
 receiving the one or more IO requests associated with the proxy volume within the storage system; and
 redirecting the one or more IO requests associated with the proxy volume within the storage system for processing on the data backup copy on the backup storage appliance.

20. The computing system of claim 17, wherein the processor is further configured to: copy data from the backup storage appliance to the storage system while processing the one or more IO requests from the storage system on the data backup copy on the backup storage appliance.

* * * * *